United States Patent
Zink et al.

[11] Patent Number: 5,953,687
[45] Date of Patent: Sep. 14, 1999

[54] METHOD AND APPARATUS FOR DISPLAYING ACTIVE PROBE TIP STATUS OF A COORDINATE MEASURING MACHINE

[75] Inventors: Joseph H. Zink, Beavercreek; Paul T. Schweizer, Oakwood, both of Ohio

[73] Assignee: Giddings & Lewis, Inc., Fond du Lac, Wis.

[21] Appl. No.: 08/914,322

[22] Filed: Aug. 18, 1997

[51] Int. Cl.[6] .............. G01C 25/00; G01B 7/008
[52] U.S. Cl. .............. 702/168; 702/95; 702/167; 364/474.37; 33/503; 33/559
[58] Field of Search .............. 702/95, 167, 168; 364/474.35, 474.37; 33/503, 504, 505, 556, 559, 560; 395/93, 99

[56] References Cited

U.S. PATENT DOCUMENTS

| | | | |
|---|---|---|---|
| 4,437,151 | 3/1984 | Hurt et al. | 702/95 |
| 4,636,960 | 1/1987 | McMurtry | 702/168 |
| 4,727,653 | 3/1988 | Fujitani et al. | 33/503 |
| 4,733,969 | 3/1988 | Case et al. | 356/375 |
| 4,819,195 | 4/1989 | Bell et al. | 702/95 |
| 4,882,848 | 11/1989 | Breyer et al. | 33/559 |
| 4,945,501 | 7/1990 | Bell et al. | 702/95 |
| 5,402,582 | 4/1995 | Raab | 33/503 |
| 5,412,880 | 5/1995 | Raab | 702/167 |
| 5,471,406 | 11/1995 | Breyer et al. | 702/168 |
| 5,526,576 | 6/1996 | Fuchs et al. | 33/503 |
| 5,724,264 | 3/1998 | Rosenberg et al. | 364/474.37 |

OTHER PUBLICATIONS

Giddings & Lewis, Inc., Sales Brochure for Cordax MeasureMax, 2 pgs., 1997.
Helmel, Advertisement for Checkpack CMM, 2 pgs, 1997.
Giddings & Lewis, Inc., Sales Brochure for R–Series, Cordax Coordinate Measuring Machines, 6 pgs., 1995.
D.E.A., Sales Brochure for Swift CMM, 6 pgs., Mar. 1994.
D.E.A., Sales Brochure for Scirocco CMM, 6 pgs., Mar. 1994.
International Metrology Systems, Sales Brochure for Impact, 6 pgs.
CORDAX 1800 Series Coordinate Measuring Machines sales brochure, Giddings & Lewis, Inc., 1996, 6 pgs.
Integrated Software Solutions sales brochure, Giddings & Lewis, Inc., 1995, 8 pgs.

*Primary Examiner*—John Barlow
*Assistant Examiner*—Bryan Bui
*Attorney, Agent, or Firm*—Foley & Lardner

[57] ABSTRACT

A CMM control system which presents a three-dimensional graphic representation to the operator showing the active probe tip recognized by the CMM software. The controller software determines whether a motorized probe head is present and the exact location the probe tip. By using three-dimensional vector graphic routines, the controller software presents a graphic display of the probe relative to the machine's coordinate system. This technique minimizes the occurrence of measurement errors which could be introduced by the unwary operator who inadvertently used CMM data taken with an unrecognized probe tip.

33 Claims, 9 Drawing Sheets

Microfiche Appendix Included
(3 Microfiche, 541 Pages)

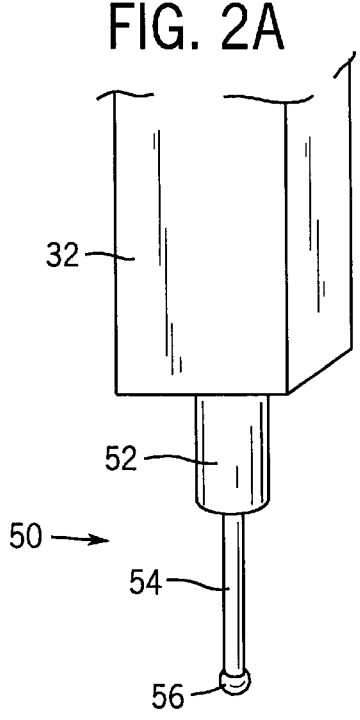
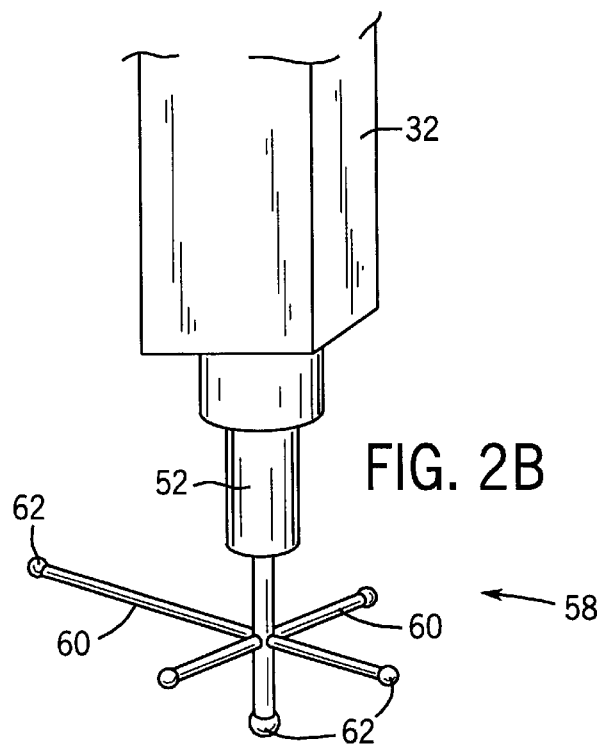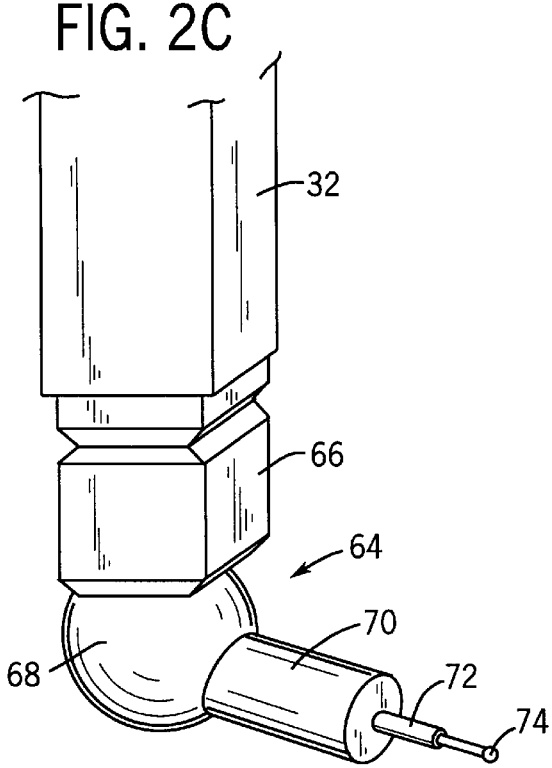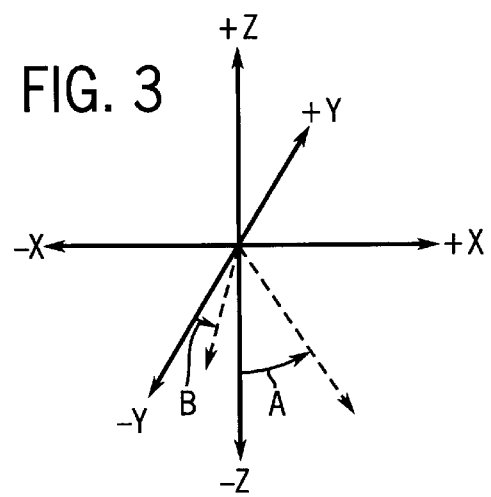

Appendix A, and is hereby incorporated by reference in this specification as fully set forth herein.

METHOD AND APPARATUS FOR DISPLAYING ACTIVE PROBE TIP STATUS OF A COORDINATE MEASURING MACHINE

REFERENCE TO MICROFICHE APPENDIX

A microfiche appendix, comprising three slides which is a total of 541 pages of computer object code listing, is submitted herewith as Appendix A, and is hereby incorporated by reference in this specification as fully set forth herein.

AUTHORIZATION TO COPY COMPUTER PROGRAM APPENDIX

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention generally relates to the operation of a coordinate measuring machine (CMM) and the like. More particularly, the present invention relates to a technique for providing immediate feedback to the CMM operator as to the status of the active probe tip of the machine.

2. Description of the Prior Art

Coordinate measuring machines (CMMs) have been used for years for industrial quality control to inspect the products of computer numerical control (CNC) machine tools and to check feature locations of parts after machining. Although the CMM was once considered an exotic tool found only in large manufacturing plants, the increased need for accurate measurement of components has become an important concern for small job shops as well. Accordingly, modern CMMs are significantly smaller and more affordable, and are becoming commonplace in the average machine shop.

However, in the past, the calibration and operation of a coordinate measuring machine was a slow and tedious process, typically designed to be used by skilled quality control inspectors. Even today, most CMMs are designed to be operated by a single, skilled user, typically for measuring either a single type of part or a series of the same type of parts. The CMM operator often uses a predetermined or "canned" part program in the "Run Mode" of operation to check tolerances on a production run of identical parts. More sophisticated CMM operators can create the part programs to perform simple measurements and provide basic inspection reports. That is not the case, however, for the machinist in the small job shop who only occasionally needs to use a CMM. In many of the smaller shops, these "walk-up users" are trained CNC machine tool operators, toolmakers, etc., who only need to make a few quick measurements to verify a tool setup. The walk-up user does not have extensive training in the operation of the CMM, and may have little or no familiarity with the setup or calibration procedure of the machine. Hence, the walk-up user requires a simple, fast, user-friendly computer interface that will allow him to quickly make his measurements and get back to machining the part.

Most CMMs nowadays have a fairly sophisticated computer software user interface designed for the average, skilled CMM operator. Since the CMM operator needs to know the relative position of the probe tip with respect to the axis of the machine, most software interfaces require the CMM operator to define the part's orientation with respect to the CMM, calibrate the machine to the required probe tip, and then perform the measurement. Although this procedure may suffice for the typical CMM operator who only has to set up the machine once for a certain production run, it is not very desirable when it comes to the walk-up user.

This initial setup and calibration procedure becomes even more tiresome when there are other walk-up users sharing the same CMM. In this case, each walk-up user must know what the status of the machine is before beginning to use it. Since different types of CMM probes are used to measure different parts or part features, the walk-up user must know which probe is currently on the machine and was previously calibrated before he starts to use the CMM. Unlike the case for a CMM having a single, dedicated user, the walk-up user cannot rely on a previous calibration. For example, if there were five walk-up users sharing a single CMM, they may all have their favorite probe tips calibrated for the part they are working on. When the next operator walks up to the CMM, he must check to see if the probe was modified, i.e., whether the CMM control software knows what probe is currently being used.

In fact, as can be appreciated by those skilled in the art, each CMM probe may have a different probe head, probe stylus, and probe tip orientation. For example, the commonly used star probe may have five different probe tips, but only one of the tips, called the "active probe tip", has the proper tip coordinates that correspond to those to which the CMM software was setup and calibrated. Some CMM software interfaces simply display the operator's coined name of the probe and assume that the operator has some type of probe management scheme which is consistent between multiple operators. This is often not the case. A second operator may recalibrate a different probe tip using the same coined name. For example, the first operator may pick a certain probe tip and calibrate the tip as "tip zero". The second operator could walk up to the machine, see that the software interface shows that "tip zero" has just been calibrated as he left it a short while ago, and would start using the machine. It is also possible that the walk-up user would not notice that the orientation of the probe tip had been changed by the prior operator, even with the same probe. Significant measurement errors would be introduced by the unwary operator who used CMM data taken with the wrong probe or probe tip orientation.

A need, therefore, exists for a more user-friendly and less error-prone software interface for a coordinate measuring machine which improves the operator's ability to determine the probe status of the CMM.

OBJECTS AND SUMMARY OF THE INVENTION

Accordingly, it is a general object of the present invention to provide a CMM having a user-friendly software interface that overcomes the aforementioned disadvantages.

It is a more particular object of the present invention to provide an improved method of operating a CMM which is adapted for use by multiple operators.

It is a further object of the present invention to provide immediate visual feedback to the CMM operator as he approaches the machine as to which probe tip is recognized by the CMM software as the active probe tip.

The present invention provides the operator with instantaneous visual feedback in the form of a pictorial representation of the active probe tip. The probe tip representation appears as a three-dimensional graphic image of the one active probe tip which is recognized by the CMM software. The graphic image of the probe tip is designed to represent both the physical characteristics of the active probe tip as well as its orientation. Such physical characteristics would include whether or not the probe has a motorized head, the relative length of the probe, and the relative shape of the probe. The orientation of the active probe is graphically displayed with respect to the CMM's X-Y-Z coordinate axis. The orientation angles A and B are also represented in the probe image. The relative size of different probes is also displayed.

The probe tip graphic image is displayed on the monitor screen of the personal computer (PC) which controls the CMM. The shape and dimensions of the active probe tip graphic image are determined mathematically by the software. In the preferred embodiment, the probe image is the default display which initially appears in place of the X-Y-Z parameter display. When the operator clicks the mouse cursor on the probe graphic image, the software will toggle the image between the probe image for the selected probe tip and the X-Y-Z parameter display for that probe tip.

In the preferred embodiment, the probe image can be rotated by the operator. This aspect allows the operator to view the probe tip image from a preferred angle such that a probe tip would not be hidden by its own image. The probe image itself is divided into particular windows or regions which serve as control buttons. The operator can change the viewing position for the image by clicking on a particular region of the image. The operator clicks on the left or right portion of the image to move the operator's viewpoint left or right. Similarly, the operator may click on the upper or lower region to change the viewer's perspective upward or downward. Clicking in the center of the region toggles the display to the X-Y-Z parameter area.

Hence, the present invention provides a highly informative and user-friendly control interface for the walk-up user of a CMM, which allows him to immediately determine the active probe tip by glancing at the visual display. The operator will immediately recognize from the size, shape, and orientation of the probe in the graphic display whether the probe tip has been changed or reoriented since the last time he used it. In this way, there is a significantly reduced chance of the walk-up user mistakenly utilizing the wrong probe tip, which would introduce significant measurement errors.

BRIEF DESCRIPTION OF THE DRAWINGS

The features of the present invention which are believed to be novel are set forth with particularity in the appended claims. The invention itself, however, together with further objects and advantages thereof, may best be understood by reference to the following description when taken in conjunction with the accompanying drawings in which:

FIGS. 2A–2C are perspective views of typical probes used in the CMM of FIG. 1;

FIG. 3 is a two-dimensional representation of the three-dimensional coordinate system of the CMM of FIG. 1;

DETAILED DESCRIPTION OF THE PREFERRED EMBODIMENT

Figure 1:
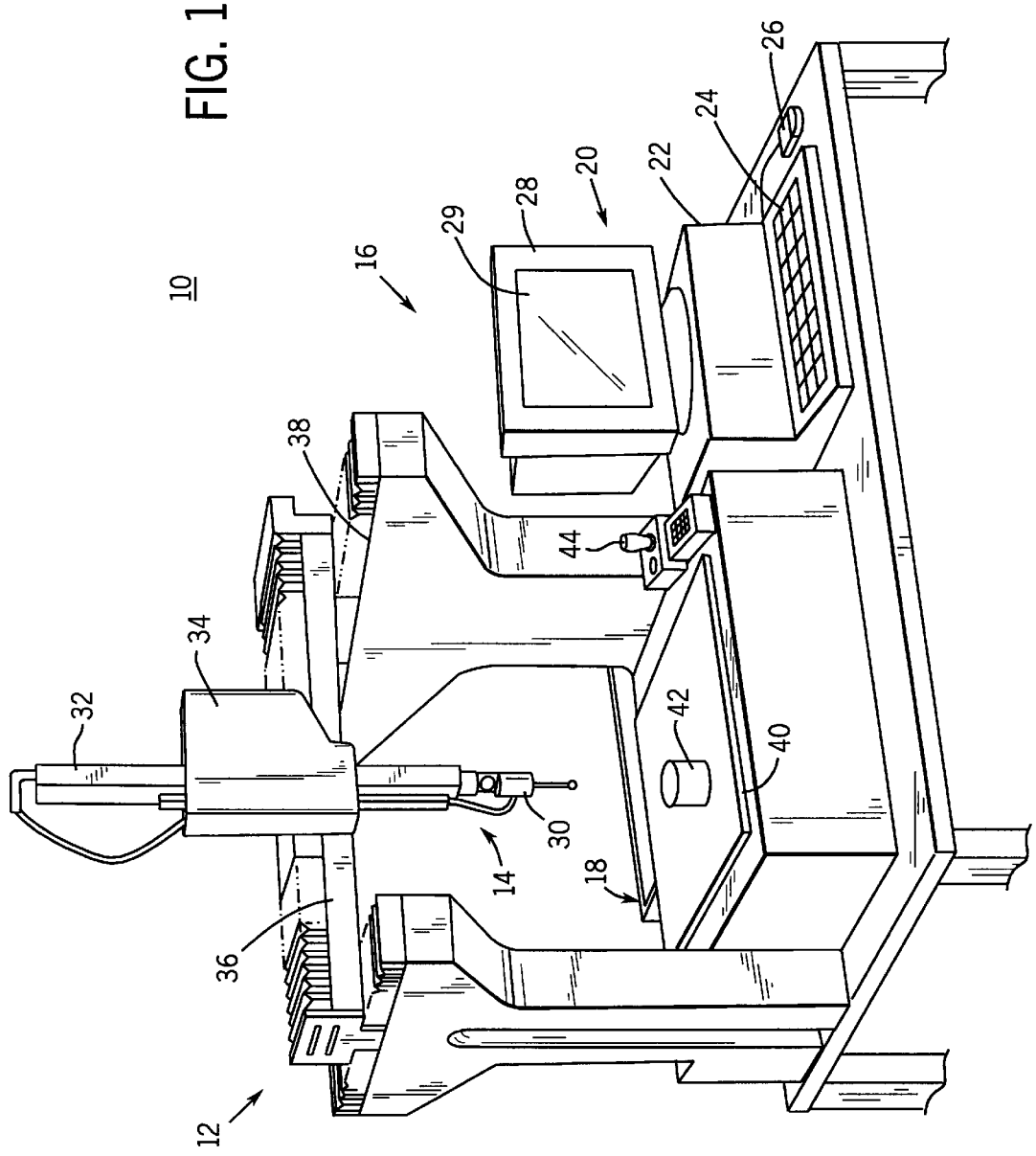
FIG. 1 is a perspective view of a typical CMM system according to the present invention.

Referring now to FIG. 1, there is illustrated a coordinate measuring machine (CMM) generally indicated by the reference numeral 10. The CMM 10 typically includes an X-Y-Z positioning device, generally indicated as 12; a probe system 14, and a control system, generally indicated as 16. The control system 16 includes a machine controller 18, computer hardware 20, and computer software for programming the hardware. In the preferred embodiment, the computer hardware 20 includes an IBM-compatible personal computer (PC) 22 having a keyboard 24, a mouse 26, and a video display monitor 28 having a display screen 29. Preferably, the PC should be capable of effectively running the WINDOWS NT or WINDOWS 95 (trademarks of Microsoft, Inc.) operating system.

The probe system 14 includes a probe 30 which is inserted into a Z-axis probe arm or shaft 32 of the positioning device 12. The probe shaft 32 is supported and guided for movement in the Z-axis direction by a Z-axis carriage 34 using preloaded air bearings or the like. The Z-axis carriage 34 is supported on a top rail X-axis carriage 36 by preloaded air bearings or the like. The X-axis carriage 36, in turn, is also supported and guided by preloaded air bearings or the like on a Y-axis carriage 38 for movement in the Y-direction. The device 12 also includes a platform or worktable 40 which typically contains tapped holes to facilitate the clamping and locating of parts.

In a typical operation, the part to be measured 42 is placed on the worktable 40 of the CMM at a random location. Generally, this location is approximately central to the machine X-Y-Z axes in order to access all of the part surfaces to be inspected with the probe. The measuring envelope or volume is defined by the X-Y-Z travel of the machine. Depending upon the size of the part and the type of probe used, the part may need to be clamped to the machine table. If multiple inspections of similar parts are required, a reference location point may be established with a reference precision cube or sphere. The probe is then moved, manually or under machine control using the joystick 44, until contact is made with the desired part feature. Reader heads, travelling on each axis along built-in axis measuring scales, transfer the instantaneous machine position to the computer interface where the software performs three-dimensional geometric analysis. The dimensions and geometries may then be calculated, compared, evaluated, stored, or printed out as required.

For further details regarding the overall construction and operation of a CMM and the computer interface therefor, refer to U.S. Pat. No. 4,819,195, which is hereby incorporated by reference as if fully set forth herein. An example of a coordinate measuring machine which can be used with the present invention is the CORDAX (trademark of Giddings & Lewis, Inc.) model number RS-5 available from the Sheffield Measurement division of Giddings & Lewis, Inc. located in Dayton, Ohio.

FIGS. 2A–2C are perspective views of typical probes which could be used in the CMM of FIG. 1. A simple straight probe 50 is shown in FIG. 2A, which includes a probe body 52, a probe stylus 54, and a probe tip 56. A more complex star probe 58 is shown in FIG. 2B, having multiple probe styli 60 and multiple probe tips 62. The more sophisticated articulating probe 64 of FIG. 2C includes a motorized head having a fixed head portion 66 and an rotating and articulating joint portion 68 for holding the probe body 70. Using the articulating head, the probe stylus 72 can be orientated to various positions to gain access for the probe tip 74 to take a measurement inside a cavity or the like. An example of such an articulating probe 64 commonly used in CMMs would be the Renishaw PH-9 or PH-10 probe available from Renishaw Ltd., U.K.

As is known in the art, the CMM operator may require a first probe having a long probe stylus to reach inside a first part, a second probe having a large diameter probe tip to measure a rough surface of a second part, and a third probe having a pointed probe tip to precisely measure the lip of a third part feature. Each probe tip must be recalibrated each time it is changed. The computer software knows which probe tip is being recognized as the active probe tip, but the operator may not. As mentioned above, the problem with most CMMs is aggravated in the small job shop in that the walk-up user may not realize that a previous operator has changed the probe tip. Even if the CMM software allows each operator to calibrate and individually name a number of probe tips, there must be some type of probe management system in place to keep track of the probes. For example, a first walk-up user may calibrate a three-inch straight probe as "TIP-0", but the next walk-up user may calibrate a six-inch straight probe as TIP-0. When the first walk-up user returns to the CMM, he sees that a straight probe is still in the CMM and calibrated as TIP-0, and proceeds to take an erroneous measurement. Moreover, if a different probe tip 62 of the star probe 58 is calibrated as TIP-0, there would be nothing physically different for the walk-up user to notice which would indicate that any changes were made. The articulated probe 64 presents even more problems, since there is even less of a chance that the walk-up user would notice a minor change in the orientation of the articulating probe stylus 72.

FIG. 3 is representation of the coordinate system of the CMM of FIG. 1. CMMs typically utilize the X-Y-Z Cartesian coordinate system, which is labelled +/-X, +/-Y, +/-Z as shown in FIG. 3. If the probe includes a motorized or articulating head, the probe can be oriented at a particular articulation angle commonly referred to as the "A" and "B" angles. The A-angle represents the vertical angle between the negative Z-axis and the position of the probe stylus as shown, wherein a 0° A-angle would represent an orientation straight down along the Z-axis, and a 90° A-angle would represent the probe stylus residing somewhere in the X-Y plane. The A-angle can typically be varied in 7½° increments from 0° to 105°. Note that the A-angle always lies in the plane defined by the Z-axis and the probe stylus. As also shown in FIG. 3, the B-angle represents the horizontal angle between the front or -Y axis to the position of the probe stylus. The B-angle lies in the plane containing the X and Y axes. The B-angle varies from 0° (representing the -Y axis) to 360° also in 7½° increments.

The CMM software typically calibrates the location of the probe tip with respect to a reference position, called the MEA (microprocessor enhanced accuracy) position in the preferred embodiment. The MEA position is located at the dead center point on the bottom of the probe shaft 32. The MEA position represents the initial point from which all calibration measurements are taken as offsets.

The key to the productivity of all forms of computer assisted CMMs lies in the sophistication and ease of use of the associated computer software. The user-interface software may be the most important element in any CMM system because its capability determines how many part features can be measured, while its simplicity determines the extent and how often the machine is used. Since modern CMMs use personal computers to control the CMM, the operator interface software resides on the PC. For example, the MEASUREMAX (trademark of Giddings & Lewis, Inc.) software is available to run on the WINDOWS 95 and WINDOWS NT operating systems which are widely used in PCs. Refer to the MEASUREMAX software and documentation, available from Sheffield Measurement, for further details regarding the overall operation of the software interface.

Figure 4A:
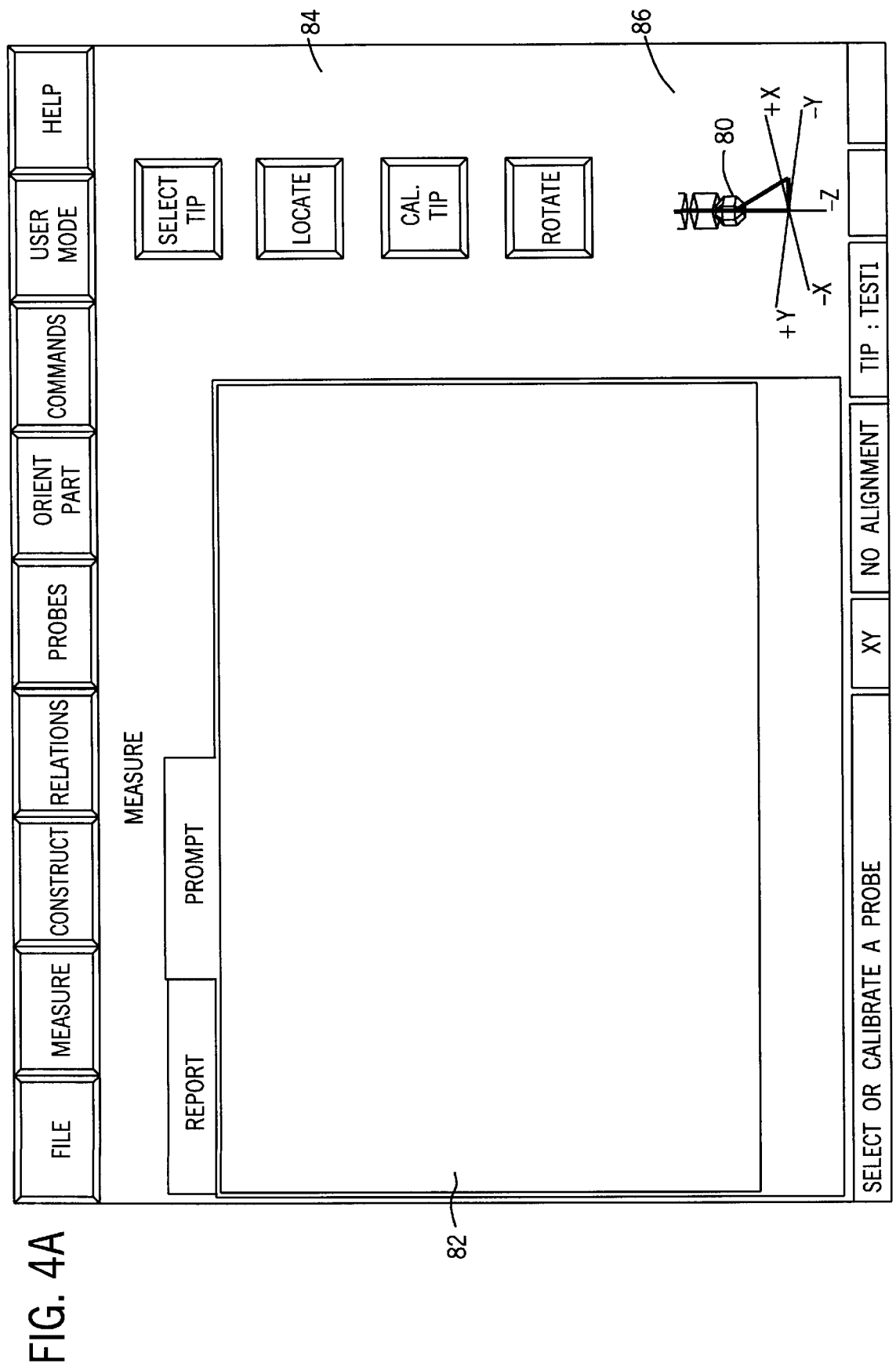
FIGS. 4A–4B are pictorial representations of screen displays presented on the personal computer display monitor for operator interface in accordance with the present invention.

FIG. 4A represents one of the screen displays which appears on the personal computer display monitor screen 29 for operator interface in accordance with the present invention. Notice in FIG. 4A that a graphic image 80 of the lower portion of the probe is displayed in the lower right corner of the screen. This graphic image 80 represents the active probe tip configuration recognized by the CMM software. As will be shown in the following figures, the probe image 80 will appear differently for different active tips. For example, the straight probe of FIG. 2A will appear as a straight line representation, while the articulated probe of FIG. 2C will appear as the triangular shape shown in FIG. 4A. Since the different probe configurations are displayed as a graphic image on monitor screen, the CMM operator is immediately presented with a visual indication of the active probe tip recognized by the CMM software.

Figure 4B:
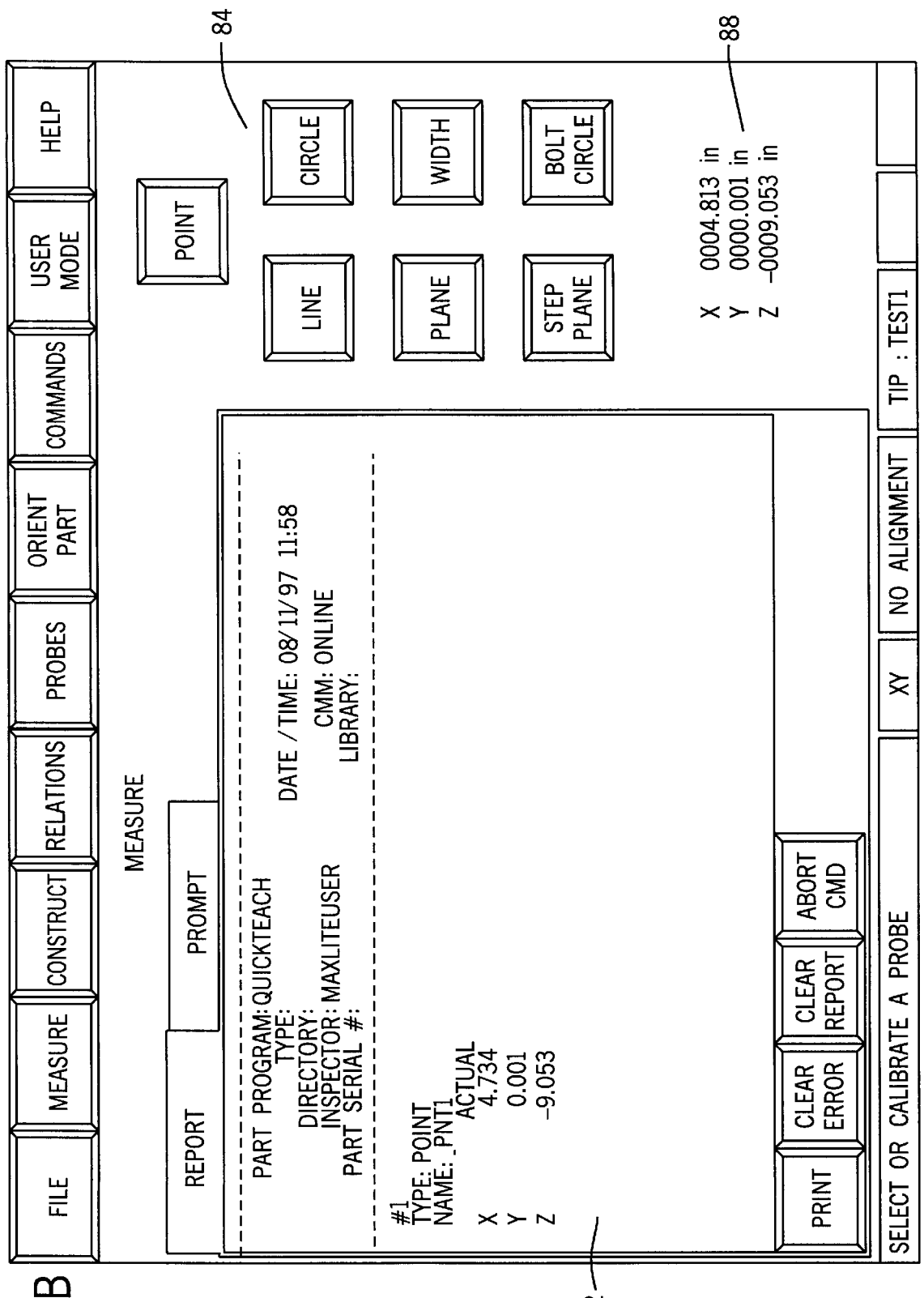

In FIG. 4A, the probe image 80 is shown to the right of a measurement display area 82 and below a series of icon buttons located in a button area 84. The probe image 80 itself is located in a probe display area 86. The probe display area 86 contains certain window "click regions" which will be described in detail below. If the operator clicks the mouse cursor on the probe image 80 in the center of the click region, the probe image 80 will disappear and the X-Y-Z parameter display 88 will appear as shown in FIG. 4B. If clicked again, an error message display (not shown) will appear to indicate whether or not a system error has occurred. The probe image 80, the X-Y-Z parameter display, and the error message display will toggle with each click of the mouse. Depending on the display monitor used, the click region may also be activated by a touch screen. Touch screens usually generate standard click events, so long as the click region is large enough to be used with a touch screen.

FIGS. 5A–5F are enlarged pictorial representations of the probe image 80 for six representative active probe tip configurations. Certain vector graphics routines are used to generate each probe image individually. Each probe image 80 also contains a representation of the X-Y-Z axes. In the preferred embodiment of the invention, the X-Y-Z reference axes 90 of the CMM coordinate system are drawn with thin, green lines.

Figure 5A:
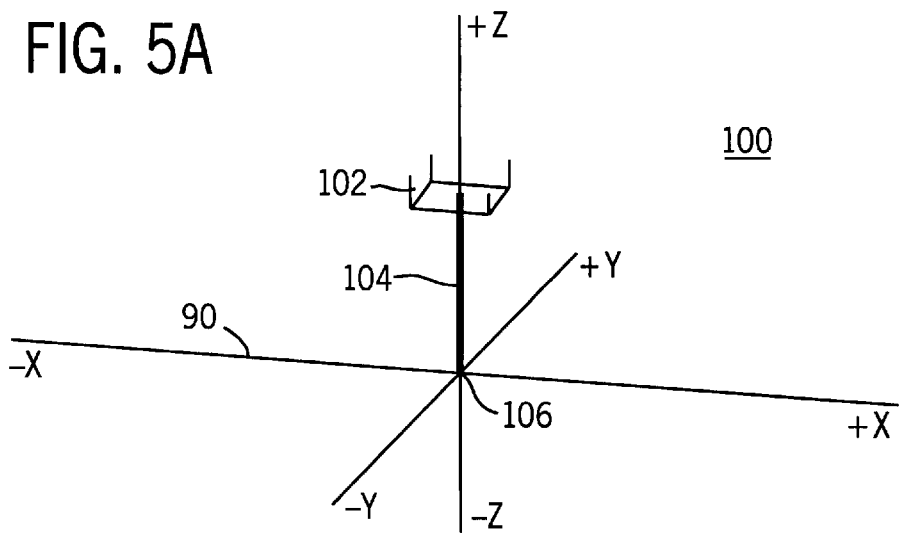
FIGS. 5A–5F are enlarged pictorial representations of that portion of the screen display of FIGS. 4A–4B containing the probe tip graphic image for six representative active probe tip configurations.

FIG. 5A shows a probe image 100 representing the straight probe 50 shown in FIG. 2A. Only the bottom portion of the probe shaft 32 is represented in the graphic display as probe shaft 102, drawn as the lower portion of a cube. The probe stylus 54 is represented with a single line 104 extending straight down from the MEA position (located at the bottom of the probe shaft 102 along the Z-axis) to the probe tip 106. The length of the line segment 104 is proportional to the Z-offset measurement, which in this case represents the entire length of the straight probe 50.

Figure 5B:
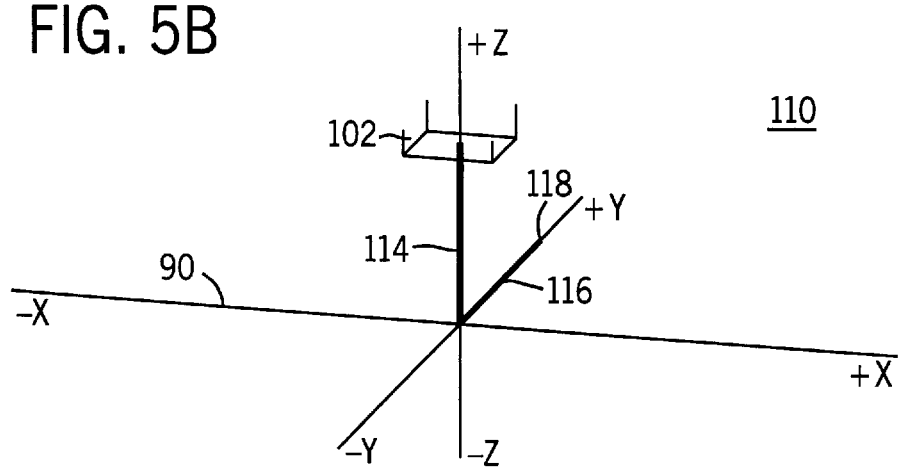

FIG. 5B shows another probe image 110 for a right angle probe or for one of the radial tips of the star probe 58 of FIG. 2B. In this case, the probe is represented with two line segments. The first segment 114 is straight down in the −Z direction from the MEA position as before. Again, the length of this line is the Z-offset. The next line segment 116 starts from the end of the first segment 114 (at the X-Y-Z origin) and extends rearwardly to a point in the X-Y plane specified by the X and Y offsets. In this simple example, the X-offset is zero, such that the probe tip 118 lies on the +Y axis.

Note that the representation of the probe shaft 102 appears larger in probe image 110 of FIG. 5B than it appears in the probe image 100 of FIG. 5A. This is due to the fact that the vector graphics routine is scaled in accordance with the length of the probe. For example, FIG. 5A could represent a six-inch straight probe, while FIG. 5B could represent a six-inch bent probe. Although these probe lengths are the same overall, only that three-inch portion of the probe stylus which lies along the Z-axis for the bent probe image 110 is scaled to a reference value of 1 (i.e., the unity vector) in FIG. 5B, while the entire six-inch length of the probe stylus which lies along the Z-axis is scaled to the unity vector in FIG. 5A. Hence, in probe image 110, the size of the probe shaft representation 102 has been increased accordingly.

Figure 5C:
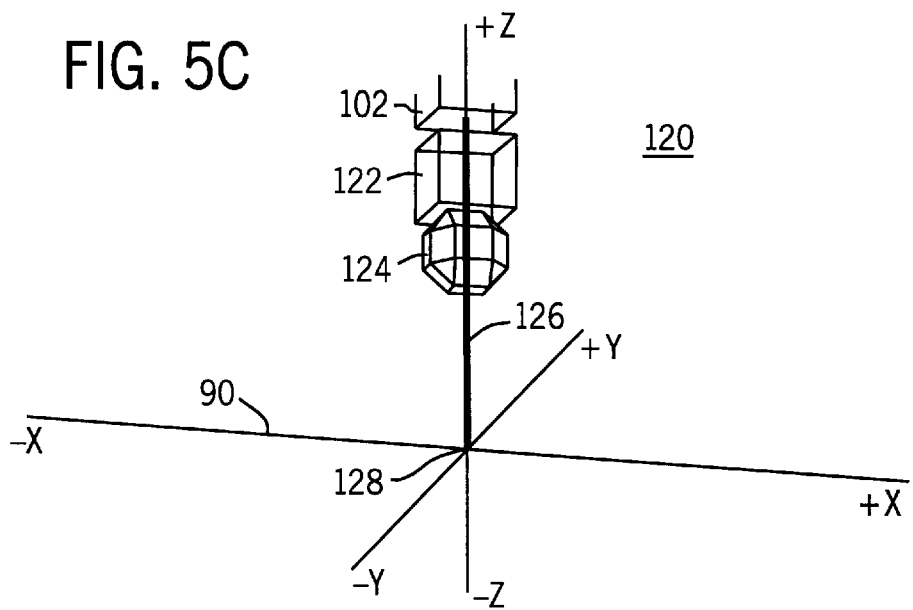

FIG. 5C illustrates a probe image 120 for the probe 64 having a motorized head. The motorized head is represented in two parts. First, the fixed portion 66 of the motorized head is represented by a head cube 122. Second, the rotating articulation joint portion 68 of the motorized head is represented by a head sphere 124. In this probe image 120, the entire probe head is rendered with a single, thick, black line 126 which starts at the MEA position and extends through the head cube 122 and head sphere 124 to the probe tip 128. Only the lower portion of the single line segment 126 represents the probe body 70, probe stylus 72, and probe tip 74 extending downwardly, in this case, from the articulation joint to the X-Y-Z origin. As will be appreciated by CMM operators, probe image 120 is highly representative of the well-known Renishaw PH-9 or PH-10 probes. Again, the length of this line segment 126 is proportional to the distance from the MEA position to the probe tip. Accordingly, the probe image 120 represents a probe having probe tip coordinates of X=Y=Z=0 and articulation angles of A=B=0° with respect to the displayed X-Y-Z axes.

Figure 5D:
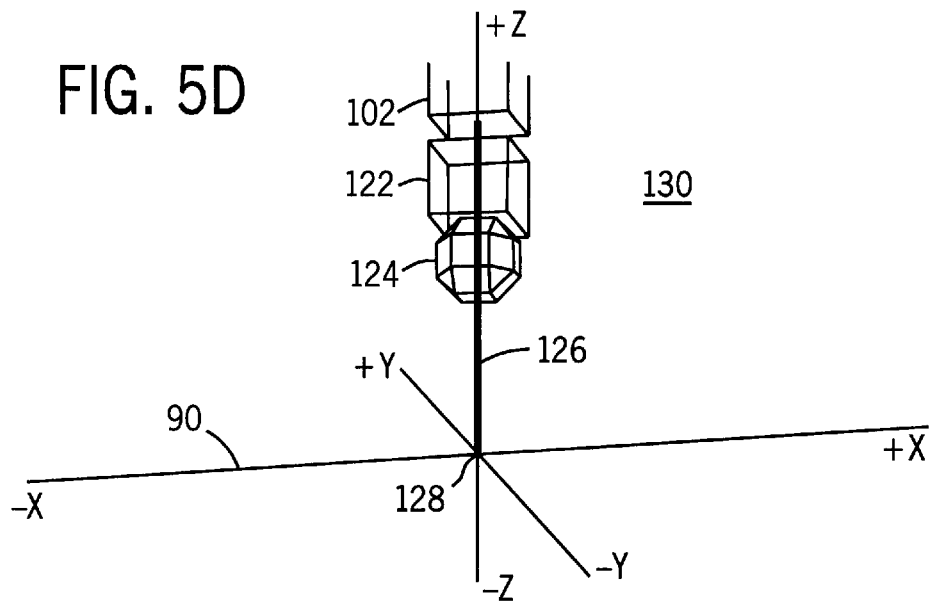

FIG. 5D illustrates a probe image 130 for the same probe and orientation as probe image 120 of FIG. 5C, but as seen from a different viewing angle. As will be shown below, it is important for the CMM operator to be able to rotate the probe image (or his viewpoint of the probe image) in order to have a clear representation of the position of the probe tip. In FIG. 5D, the operator's viewpoint of the probe image appears to have been rotated to the left approximately 60 degrees. Hence, the probe image 130 appears as if its X-Y axes were rotated 60° to the right in the X-Y plane about the Z-axis.

Figure 5E:
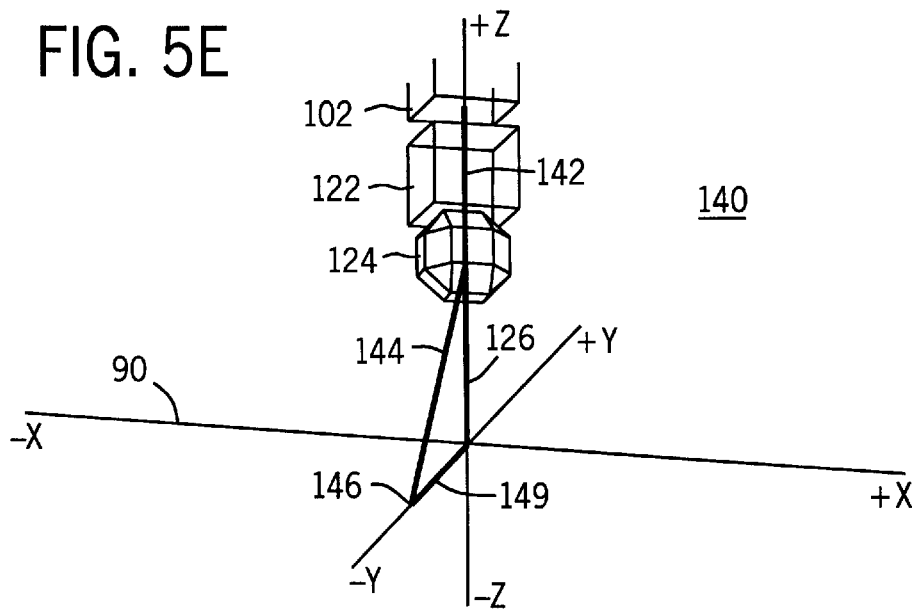

FIG. 5E illustrates a probe image 140 for the same probe 64, but having the motorized head oriented at a different articulation angle than in FIG. 5C or FIG. 5D. Although the head cube 122 and head sphere 124 are the same as before, the probe head is rendered with two thick, black line segments 142 and 144. The upper line segment 142 again starts at the MEA position and extends through the head cube 122 to the center of the head sphere 124. The length of this upper line segment is proportional to the distance from the MEA position to the center of the articulating joint 68. However, the lower line segment 144, which represents the probe body 70, probe stylus 72, and probe tip 74, extends outwardly from the center of the head sphere 124 in the direction of the A and B articulation angles. The length of this lower segment 144 is proportional to the distance from the center of the articulating joint to the probe tip 74. Accordingly, the probe image 140 would represent a probe tip having tip coordinates of X=0, Y=Negative, Z=0 with respect to the displayed axes, and articulation angles of approximately A=+30° and B=0°. Note that a Z-axis projection line 148 and an X-Y plane projection line 149 for the line segment 144 are also shown in the probe image 140. Although not entirely apparent here, these projection lines are rendered using thin black lines in the preferred embodiment.

Figure 5F:
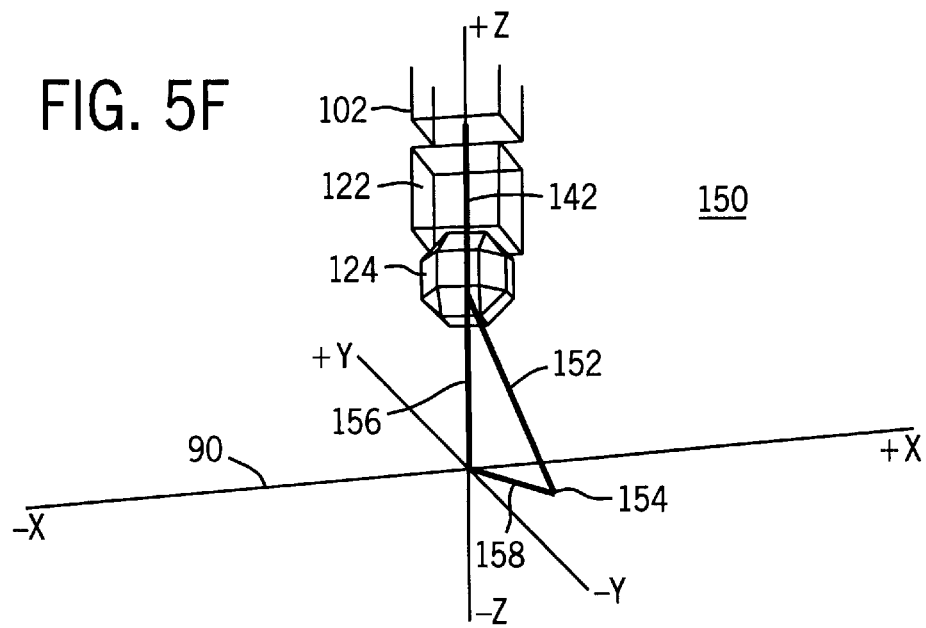

Since FIG. 5E shows a probe orientation of A=+30° and B=0°, the probe image 140 clearly shows the location of the probe tip to the CMM operator. However, if the probe orientation were changed to A=+30° and B=+30° (where the probe tip would have been moved +30° toward the +X axis in the X-Y plane), then the lower segment 144 would appear in line with the Z-axis such that the probe image 140 would appear substantially the same as the probe image 120 shown in FIG. 5C. Although the length of the lower line segment 144 would extend slightly below the X-Y plane, the articulation angle A would be entirely hidden since it is directly in line with the operator's perspective. For this reason, the software lets the operator rotate the axes so the probe image more clearly illustrates the orientation of the probe. FIG. 5F is an example of such a change in viewpoint.

In FIG. 5F, a probe image 150 clearly illustrates that the probe tip 154 is oriented at A=+30° and B=+30° since the operator's viewpoint has changed from that of FIG. 5E to that of FIG. 5D. The operator simply clicked on the outer left portion of the image to move his viewpoint to the left, effectively rotating the image around the Z-axis to the right.

Figure 6:
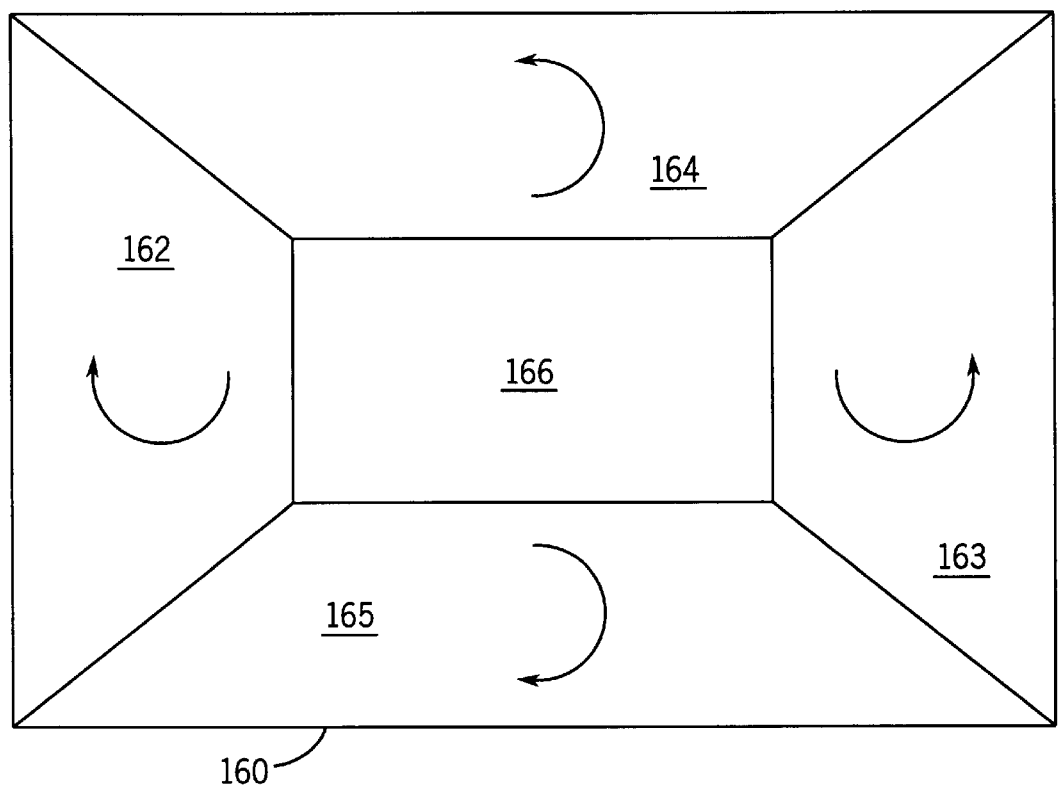
FIG. 6 is a pictorial representation of the layout of the probe image display area showing the five individual regions which comprise the control buttons to change the probe image display.

FIG. 6 illustrates a layout 160 of the probe image display area 86 of FIG. 4A, showing the five individual regions which simulate control buttons to change the probe image viewpoint. As mentioned above, in the preferred embodiment, the view of the probe image can be changed by the operator. This allows the operator to effectively position his viewpoint to a preferred orientation for the clearest view of the probe tip. The ability to shift the operator's viewpoint provides for the proper display of a probe tip that is hidden by its own image. In the preferred embodiment, the probe image display area 86 is divided into five individual windows or regions which serve as hidden control buttons. The operator can change the viewing position for the image by clicking on a particular region of the image. The operator may click in the left region 162 or right region 163 to move the operator's viewpoint left or right, respectively. Similarly, the operator may click in the upper region 164 or lower region 165 to change the viewer's perspective upward or downward, respectively. The operator may click in the center region 166 to toggle the image in the probe image display area 86 between a probe image 80 and the X-Y-Z parameter display 88. Of course, if a touch screen monitor is used, the operator would simply touch on the appropriate portions of the probe image to change his viewpoint or displayed image. Note that the layout 160 of the probe image display area 86 overlays the probe image and is hidden to the operator.

The CMM control system of the present invention provides the three-dimensional graphic representation of the active probe tip without additional information from the operator. Since the controller can determine from the system configuration information whether a motorized probe head is present, the software decides whether or not to draw a motorized head. The software also has access to the information representing the calibrated location of the probe tip. By using this information, the system presents a graphic display of the probe relative to the machine's coordinate system. In the preferred embodiment, three-dimensional vector graphic routines are used by the controller software to mathematically determine the size and shape of the rendered probe image. Alternatively, the probe image could be selected from a number of predetermined images stored in memory. However, in that case, the visual accuracy of the probe image is most likely reduced. It would also require the additional step upon calibration for the operator to associate each probe tip with a particular stored probe image.

Since the probe image representation of the preferred embodiment includes the size, shape, and orientation of the probe relative to the X-Y-Z coordinate axis, a large amount of visual information is presented to the operator. As mentioned above, the length of the line segment representing the probe stylus is proportional to that of the actual probe. The shape of the probe shaft and motorized head also closely resemble the actual probe. Moreover, the size of the probe in the graphic image is scaled to be proportional to the actual dimensions of the probe and its angular displacement. For example, notice that the size of the motorized head cube 122 and articulation joint head sphere 124 of FIG. 5F appears slightly larger than that of FIG. 5D, since the Z-axis projection line 156 of the line segment 152 in FIG. 5F is slightly shorter than segment 126 in FIG. 5D.

Figure 7:
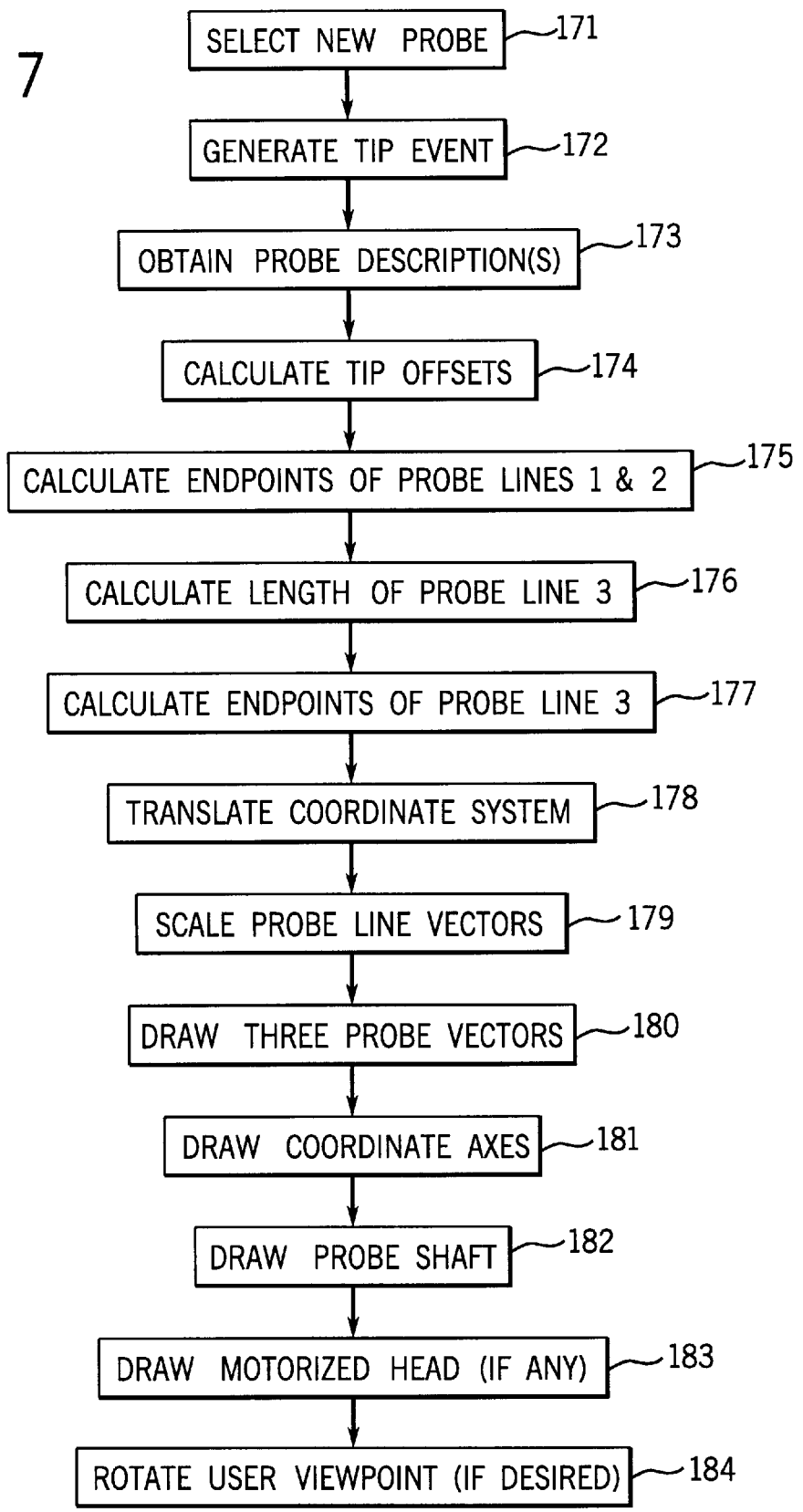
FIG. 7 is a software program flowchart illustrating the general sequence of operations performed by the CPU of the personal computer in generating the probe tip graphic image displays of FIGS. 5A–5F in accordance with the practice of the preferred embodiment of the present invention.

FIG. 7 is a software flowchart 170 illustrating the basic steps used in generating the probe tip graphic image display 150 of FIG. 5F in accordance with the preferred embodiment of the present invention. Since the actual computer software code performs numerous simultaneous events, it does not lend itself to being documented as a typical flowchart. Accordingly, the flowchart of FIG. 7 is only intended to represent a general sequence of tasks being performed by the software interface, and should not be construed to represent a specific, sequential series of steps.

In Step 171, a new probe is selected from a list of previously calibrated probe tips. This is done either manually by the CMM operator (by clicking on the "Select Tip" button in the screen of FIG. 4A) or automatically by the CMM part program operating in the Run Mode or Program Mode. In Step 172, the CMM generates a tip event signal. In the preferred embodiment, the MEASUREMAX core code automatically generates a tip event whenever it recognizes any change to the probe head. This tip event is passed to the probe image display software as a monitor event.

Next, in Step 173, the probe image display software catches the monitor event and looks at the probe database to find a description of the new probe. This data description includes the X-Y-Z positions of the probe tip, and the A and B angles of the probe head if one is present. These five pieces of information are used by the vector graphics routines to render the probe image. The existence of a motorized probe head is determined from the CMM properties stored in the configuration program. In the preferred embodiment, the probe database is stored in the WINDOWS system registry.

For example, if the tip event indicated that the probe tip called 'PROBE1' was to be used, then the database information for the PROBE1 description might look like:

X=34 mm
Y=−58 mm
Z=18 mm
A=30 degrees
B=30 degrees where X, Y, and Z are the calibrated offsets from the TIP-0 position. The database information for the TIP-0 description might look like:

X=0 mm
Y=0 mm
Z=−225 mm where X, Y, and Z are the calibrated offsets from the MEA position.

In Step 174, the offsets of the desired probe tip (PROBE1) are added to the offsets of the reference probe tip (TIP-0) position to provide the X-Y-Z position of the probe relative to the MEA positions. Continuing with the above example, the X-Y-Z offsets for PROBE1 would be:

X=34 mm
Y=−58 mm
Z=−207 mm

Step 175 determines the start point and endpoints of the two lines used to represent the probe. These two lines are shown in FIG. 5F as first line 142/156 along the Z-axis and second line 158 in the X-Y plane. The software determines that the probe shaft is 100 mm by 100 mm square, and that the MEA position is in the middle of the bottom of the probe shaft. The MEA position is initially set to be at the origin of the coordinate system. The software also determines from the setup information that the center of rotation of the articulating probe head is 90 mm below the MEA position. Using this information, the start points and endpoints for the two probe lines can be calculated as follows:

| | |
|---|---|
| Probe Line 1 | (0, 0, 0) to (0, 0, −207) |
| Probe Line 2 | (0, 0, −207) to (34, −58, −207) |

In Step 176, the length of the third line is determined, which is used to represent the probe stylus and appear as line segment 152 of FIG. 5F. In order to draw the probe stylus line segment, the distance from the center of rotation of the probe head to the probe tip needs to be determined. This is the stylus length, and is calculated as follows:

$$L_{stylus} = \sqrt{[(Z - Z_C)^2 + X^2 + Y^2]}$$

where $Z_C$ is the position of the center of rotation of the articulating probe head. Solving this equation provides:

$$L_{stylus} = \sqrt{[(207 - 90)^2 + (34)^2 + (58)^2]} = 135 \, mm.$$

Step 177 calculates the endpoints of this third probe line. This step describes the probe stylus line in the MEA coordinate system. Note that the endpoint of this third line just happens to be at the same position as the probe tip, because the probe tip is in line with the probe body. This will not always be the case, however. (For example, the star probe or any angled probe would not have the probe tip in alignment with the probe body.) First, the stylus offsets are calculated using the stylus length and the A and B angles.

$$X_{stylus} = L_{stylus} * \sin(A) * \sin(B) = 34 \, mm$$

$Y_{stylus} = -L_{stylus} * \text{Sin}(A) * \text{Cos}(B) = -58 \text{ mm}$ $Z_{stylus} = L_{stylus} * \text{Cos}(A) = 117 \text{ mm}$ Now the offset of the center of rotation of the probe is added to the stylus offsets to determine the endpoints of the probe stylus line:

| | |
|---|---|
| Probe Line 3 | (0, 0, −90) to (34, −58, −207) |

In Step 178, the coordinate system is translated such that the origin is now at the base of the Z-offset vector. Hence, the probe image is positioned in world coordinates such that the MEA position is location (0, 0, zMEA), where zMEA is the negative of the Z-offset vector. In this example, this simply shifts all the points upwardly by the amount of the TIP-0 offset:

| | |
|---|---|
| Probe Line 1 | (0, 0, 207) to (0, 0, 0) |
| Probe Line 2 | (0, 0, 0) to (34, −58, 0) |
| Probe Line 3 | (0, 0, 117) to (34, −58, 0) |

Step 179 serves to scale these vectors so that the largest value is 1. This is done by determining which of the X, Y or Z vectors has the largest magnitude. All values are then scaled using this factor. In this example, the Z-axis length of Probe Line 1 is the largest, so the result is as follows:

| | |
|---|---|
| Probe Line 1 | (0, 0, 1) to (0, 0, 0) |
| Probe Line 2 | (0, 0, 0) to (0.164, −0.28, 0) |
| Probe Line 3 | (0, 0, 0.565) to (0.164, −0.28, 0) |

Step 180 begins the actual rendering of the probe in a virtual world coordinate system. The three line segments are rendered on the computer screen using known 3D line drawing techniques. These techniques may be found from various sources, such as in the book *Computer Graphics* by Steven Harrington, available from McGraw-Hill (1983) (ISBN 0-17-026751-0). Using the same standard line drawing techniques, the representation of the X-Y-Z axes are drawn in Step 181. The lower end portion of the probe shaft 102 is drawn in Step 182 by scaling the actual size of the probe shaft with the same scaling factor used in Step 179 and drawing it at the MEA position.

In Step 183, if a motorized probe head was selected, then the head cube 122 and head sphere 124 are drawn as a wire frame cube and sphere as shown in FIG. 5F. In the preferred embodiment, these two elements appear on the screen in thin red lines. These elements are also scaled using the same scaling factor as above.

Finally, in Step 184, the software checks to see if the operator has clicked on the probe image and, if so, determines which region was clicked. If the center region was clicked, the probe image is replaced by the X-Y-Z parameter display as described above. If an outer region was clicked, then the operator's viewpoint of the probe image is shifted in the proper direction in linear increments in accordance with the number of clicks. This is accomplished mathematically by shifting the reference coordinates used in calculating the above vector graphics routines.

The computer program microfiche appendix submitted herewith contains two executable object code programs. The first program, entitled "TEACHER.EXE", includes the vector graphics routines utilized in the preferred embodiment to generate the probe image according to the present invention. The second program, entitled "SETUP.EXE", includes the executable files required to set up the CMM and start the first program. These two program files are a beta test version of the portions of the MAXLITE (trademark of Giddings & Lewis, Inc.) CMM software which contain the present invention. The MAXLITE software normally includes portions of the core code of the previously available MEASUREMAX software. All the software was programmed using Visual Basic 4.0 and is written to the Win 32 interface standard.

Due to practical constraints, the probe image of the present invention is limited to showing only the major features of the active probe tip. For example, the resolution and size of the monitor screen and/or the assumptions made during the vector graphic calculations of the image may limit the details of the active probe tip which can be shown to the CMM operator. Generally, however, this does not present a problem because typical walk-up users seldom have two probes that look exactly alike in the probe image. If this did become a significant problem, it is contemplated that additional identification features of the active probe tip could be derived from the probe itself and displayed in the probe image. For example, a video camera could be used to determine different shapes or colors or surface indicia and provide such information to the software interface. Alternatively, the probe body may be designed to have a particular mating configuration or surface features at the mounting end which could be read by electronic sensors in the probe shaft and fed to the controller software. Furthermore, although the exact diameter of the probe stylus is not truly represented in the simple two-line graphic renderings of the preferred embodiment, this could readily be accomplished in a more sophisticated vector graphics routine if the probe stylus diameter information was known. Similarly, a more complex vector graphics routine could also display the difference between a "pencil tip" probe and a "ball tip" probe. However, none of these improvements was required for the present application.

In review, it can now be seen that the present invention provides a CMM control system which presents a three-dimensional graphic representation to the operator showing the active probe tip recognized by the CMM software. The controller software determines whether a motorized probe head is present and the exact location the probe tip. By using three-dimensional vector graphic routines, the controller software presents a graphic display of the probe relative to the machine's coordinate system. This technique minimizes the occurrence of measurement errors which could be introduced by the unwary operator who inadvertently used CMM data taken with an unrecognized probe tip.

While specific embodiments of the present invention have been shown and described herein, further modifications and improvements may be made by those skilled in the art. In particular, it should be noted that the CMM system described herein was chosen in the preferred embodiment only as a representative machine which was readily available for the particular application. However, any CMM system having an operator display that could be retrofit to provide pictorial representations of the probe tip to the operator could be used. Furthermore, the actual software programs described in the flowchart and set forth in the appendix hereto are only preferred embodiments of software codes which can be used to accomplish the invention. Numerous other hardware and software modifications may also be made to customize the present invention for various other applications. All such modifications which retain the basic underlying principles disclosed and claimed herein are within the scope and spirit of the invention.

What is claimed is:

1. A coordinate measuring machine (CMM) comprising:
   control means for measuring an object using one of a plurality of probe tips, only one probe tip being recognized by the control means at a time as the active probe tip used to take CMM measurements; and
   means for providing a visual indication to a user to distinguish which is the one active probe tip being recognized by the control means.

2. The CMM of claim 1, wherein the visual indication includes a representation of the active probe tip in three dimensions.

3. The CMM of claim 1, wherein the visual indication includes a representation of the active probe tip, the active probe stylus, and at least part of the probe shaft.

4. The CMM of claim 1, wherein the visual indication includes a graphical representation corresponding to the length of the active probe stylus.

5. The CMM of claim 1, wherein the visual indication includes a graphical representation of the orientation of the active probe stylus with respect to the CMM coordinate axes.

6. The CMM of claim 1, wherein the visual indication includes a graphical representation of the A and B articulation angles of the active probe stylus with respect to the CMM coordinate axes.

7. The CMM of claim 1, wherein the visual indication includes a graphical representation of the active probe tip, the graphical representation constructed in the control means using vector graphics software routines.

8. The CMM of claim 1, wherein the visual indication includes a graphical representation indicating whether or not a motorized probe head is recognized by the control means.

9. The CMM of claim 8, wherein the graphical representation includes an indication of the orientation of the motorized probe head and the active probe stylus with respect to the CMM coordinate axes.

10. A coordinate measuring machine (CMM) comprising:
    control means for measuring an object using one of a plurality of probe tips, only one probe tip being recognized by the control means at a time as the active probe tip; and
    means for providing a visual indication to a user in the form of a pictorial image representative of at least one distinguishable physical characteristic of the one active probe tip being recognized by the control means.

11. The CMM of claim 10, wherein the visual indication includes a representation of the active probe tip in three dimensions.

12. The CMM of claim 11, wherein the visual indication includes a representation of the active probe tip, the active probe stylus, and at least part of the probe shaft.

13. The CMM of claim 12, wherein the visual indication includes a pictorial image representative of and scaled to the length of the active probe stylus.

14. The CMM of claim 13, wherein the visual indication includes a pictorial image representative of the orientation of the active probe stylus with respect to the CMM coordinate axes.

15. The CMM of claim 14, wherein the visual indication includes a pictorial image representative of the A and B articulation angles of the active probe stylus with respect to the CMM coordinate axes.

16. The CMM of claim 10, wherein the visual indication includes a pictorial image representative of the active probe tip, the pictorial image constructed in the control means using vector graphics software routines.

17. The CMM of claim 10, wherein the visual indication includes a pictorial image representative of whether or not a motorized probe head is recognized by the control means.

18. The CMM of claim 17, wherein the pictorial image is representative of the orientation of the motorized probe head and the active probe stylus with respect to the CMM coordinate axes.

19. The CMM of claim 10, further including means for rotating the pictorial image of the active probe tip under the control of the user.

20. The CMM of claim 10, wherein the pictorial image includes projected lines along the Z-axis and in the X-Y plane.

21. The CMM of claim 10, wherein the visual indication includes a pictorial image representative of and scaled to the length of the active probe stylus, wherein the probe stylus is rendered with two lines, and the first line is drawn from the MEA position (0, 0, zMEA) to the origin of the world coordinate system (0, 0, 0).

22. The CMM of claim 21, wherein the second line is drawn from the origin of the world coordinate system (0, 0, 0), to the position of the probe tip in the X-Y plane.

23. The CMM of claim 10, wherein the pictorial image differs when a new probe is selected by the user.

24. A method of informing the user of a coordinate measuring machine (CMM) which one of a plurality of probe tips is being recognized by the CMM as the active probe tip used to take CMM measurements, comprising the steps of:
    determining which one of the plurality of probe tips is being recognized by the control means at a time as the active probe tip; and
    providing a pictorial representation of the active probe tip to the user.

25. The method of claim 24, wherein the pictorial representation includes a representation of the active probe tip in three dimensions.

26. The method of claim 25, wherein the pictorial representation includes a representation of the active probe tip, the active probe stylus, and at least part of the probe shaft.

27. The method of claim 24, wherein the pictorial representation is representative of the length of the active probe stylus.

28. The method of claim 24, wherein the pictorial representation is representative of the orientation of the active probe stylus with respect to the CMM coordinate axes.

29. The method of claim 28, wherein the pictorial representation is representative of the A and B articulation angles of the active probe stylus with respect to the CMM coordinate axes.

30. The method of claim 24, wherein the step of providing a pictorial representation of the active probe tip to the user includes the step of constructing the pictorial representation using vector graphics software routines.

31. The method of claim 24, wherein the pictorial representation is representative of whether or not a motorized probe head is recognized by the control means.

32. The method of claim 31, wherein the pictorial representation is representative of the orientation of the motorized probe head and the active probe stylus with respect to the CMM coordinate axes.

33. The method of claim 24, wherein the step of providing a pictorial representation of the active probe tip to the user includes the step of rotating the pictorial representation of the active probe tip under the control of the user.

* * * * *